3 Sheets—Sheet 1.
B. DENSMORE.
Harvester.
No. 1,262. Reissued Jan'y 28, 1862.
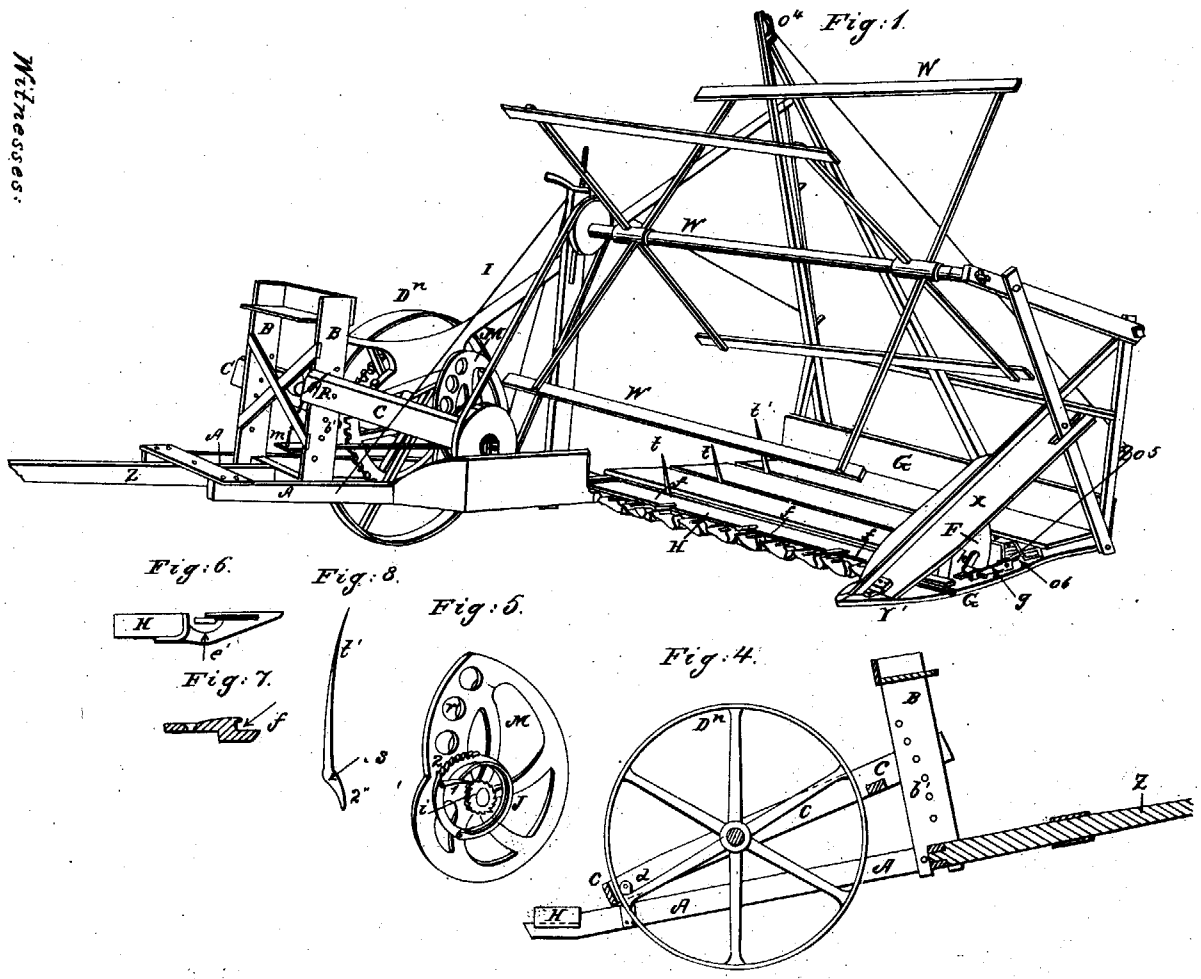
Witnesses:
D. M. Osborne for self.
D. M. Osborne. atty for W. A. Kirby.
Assignees of Byron Densmore.
N. PETERS, Photo-Lithographer, Washington, D. C.

3 Sheets—Sheet 2.
B. DENSMORE.
Harvester.
No. 1,262.
Reissued Jan'y 28, 1862.
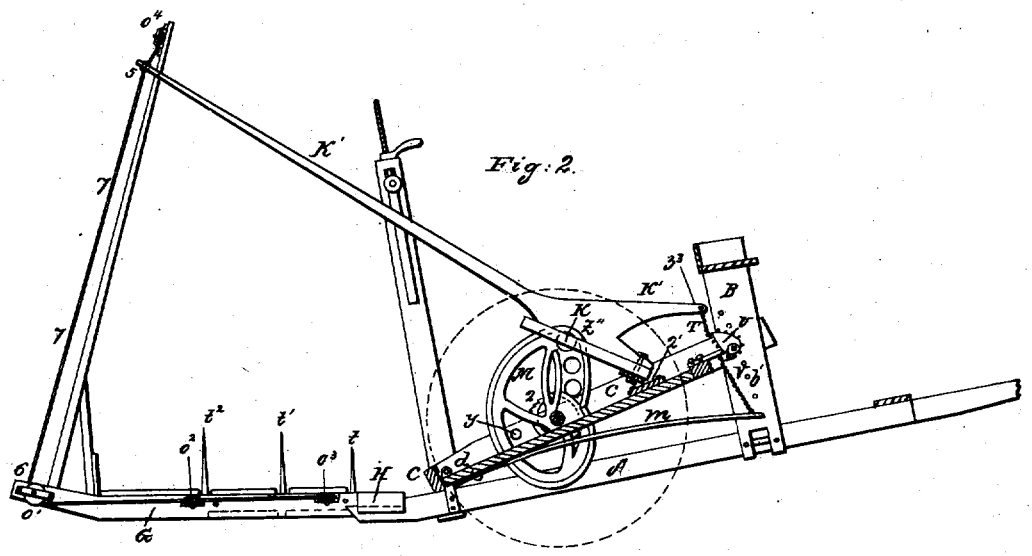
Witnesses:
D. M. Osborne for self.
D. M. Osborne atty for N. W. Kirby.
Assignees:
of
Byron Densmore.
N. PETERS, Photo-Lithographer, Washington, D. C.

3 Sheets—Sheet 3.
B. DENSMORE.
Harvester.
No. 1,262. Reissued Jan'y 28, 1862.
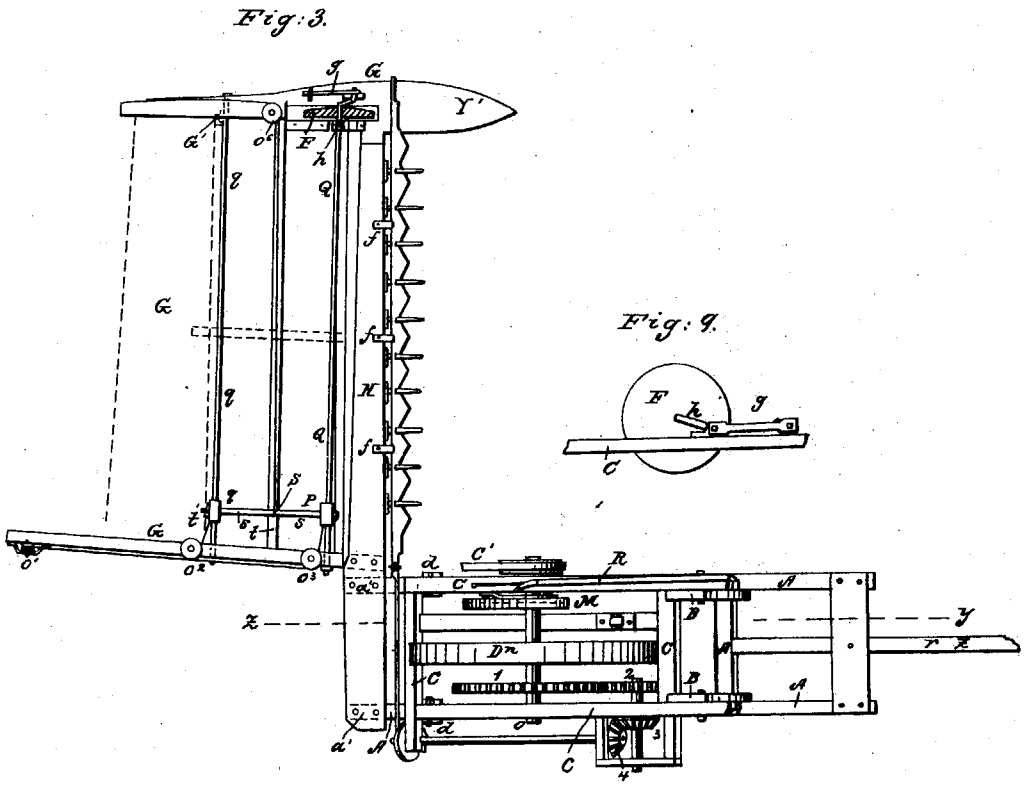
Witnesses:
D M Osborne for self.
D M Osborne atty for M. H. Kirby.
Assignees of Byron Densmore.
N. PETERS, Photo-Lithographer, Washington, D. C.

UNITED STATES PATENT OFFICE.

BYRON DENSMORE, OF SWEDEN, ASSIGNOR TO D. M. OSBORNE, OF AUBURN, AND W. A. KIRBY, OF BUFFALO, NEW YORK.

IMPROVEMENT IN HARVESTERS.

Specification forming part of Letters Patent No. 8,720, dated February 10, 1852; Reissue No. 1,262, dated January 28, 1862.

*To all whom it may concern:*

Be it known that BYRON DENSMORE, of the town of Sweden, in the county of Monroe and State of New York, assignor to DAVID M. OSBORNE, of the city of Auburn, and WILLIAM A. KIRBY, of the city of Buffalo, and State aforesaid, heretofore invented certain new and useful Improvements in Harvesting-Machines. Now, therefore, we, the said DAVID M. OSBORNE and WILLIAM A. KIRBY, assignees of the whole interest of the said BYRON DENSMORE, as aforesaid, do hereby declare that the following is a full, clear, and exact description of the construction and operation of the said invention and improvements, reference being had to the accompanying drawings, making a part of this specification, in which—

Figure I is a perspective view of the machine. Fig. II is a vertical longitudinal section on line *x y* of Fig. III. Fig. III is a top plan of the machine. Fig. IV is a vertical longitudinal section through the driving-wheel, showing the combination of the main and supplemental frames. Fig. V is a view of the outer side of the grooved cam, showing also the ratchet-wheel. Fig. VI is an elevation of the guard-finger. Fig. VII is a section of a plate or secondary finger placed intermediate between a portion of the guard-fingers to support the sickle or cutters. Fig. VIII is a view of the back tooth of the rake. Fig. IX is a view of the outside ground-wheel.

The nature and principles of the said invention relate, first, to the construction and combination of two frames—the one for supporting the driving-wheel and the other for supporting the cutting apparatus—and hinging the said frames together in such manner that the driving-wheel and cutting apparatus may each follow the inequalities of the ground independently of the other, and also that they may be bolted rigidly together for supporting the cutting apparatus at any desired height; second, in providing a ground-wheel with crank and lever for raising and lowering the outer end of the finger-bar.

Letters of like name and kind refer to like parts in each of the figures.

A represents the main frame of the machine, which consists of several pieces of timber properly framed and bolted together. This frame carries the finger-bar and cutting apparatus, as herein described.

B are two upright posts forming part of the main frame for the purpose of supporting the driver's seat and for forming an adjustable connection with the supplemental or wheel frame.

C represents a supplemental frame, in which the driving-wheel is hung, It is hinged to the main frame by means of bolt and hinge-plate, as shown at *d*, so as to allow it to have a hinge or joint-like movement, the object being to have a hinge or joint-like connection between the two frames, so as to allow an independent movement of each frame. The particular manner of forming the hinge or joint connection is not deemed important. Any mechanical means by which the end is secured will answer the principle of the invention. The opposite end of the frame moves in the arc of a circle, and in close proximity to the upright posts B, so that it may be made fast to said posts by means of bolts passing through said posts and frame at either of the several bolt-holes *b'*, by which means an adjustability is secured, and the cutting apparatus thereby raised and lowered and supported at any desired height from the ground when reaping.

When desired the adjusting-bolts may be removed entirely, and this end of the frame left free to oscillate or swing from its hinges, according to the unevenness of the ground over which the driving-wheel passes may require. By this combination and connection of the two frames it is evident that the driving-wheel, when mowing, may pass over uneven surfaces without causing an elevation or depression of the finger-bar and cutting apparatus, and the finger-bar and cutting apparatus may also conform to the inequalities of the ground independently of the position of the driving-wheel, and a uniform flexibility between the two frames constantly maintained, the elevation or depression of the driving-wheel and the elevation or depression of the cutting apparatus (occasioned by the uneven surfaces of the ground over which the machine passes) not being simultaneous nor dependent one upon the other. The axle of the driving-wheel has appropriate bearings upon the side pieces of the supplemental frame, as shown at *c'*, Fig. III.

The gear-wheels for communicating motion to the cutters are shown at 1 2 3 4, each hung in a common manner upon its appropriate shaft, as shown in Fig. III.

The ground-wheel F (shown in Figs. I, III, and IX) is on hung the crank *h*, which crank is supported by boxes on each side of the wheel, made fast to the frame. G; or it may be supported on the finger-bar or divider in any convenient manner, so that the wheel may be made to adjust and carry the outer end of the finger-bar, as desired. One object of hanging this wheel on a crank-shaft with a lever attachment thereto is to provide a means for conveniently raising and carrying the outer end of the cutting apparatus free from the ground when it is desirable to move the machine from place to place. Another object is to afford a means for raising, lowering, and supporting the outer end of the finger-bar and cutting apparatus at different heights from the ground when the machine is used for reaping. The essential feature of this part of the invention is hanging the wheel upon a crank-shaft with the crank and lever for operating the same, so that the purpose of raising and lowering the outer end of the finger-bar is attained. The precise details of the arrangement are not deemed important.

The finger-bar H is made fast to the side pieces of the main frame upon the upper side of the said pieces by bolts or otherwise, as shown at *a'*, so that the inner side piece will serve as an extension-shoe or runner to slide over the stubble or mown grass, and protect the heel of the cutters.

D *n* is the driving-wheel; Z, draft pole attached to the main frame, and to which the team is harnessed in the common manner.

Having thus fully described the construction and operation of the said improvement, what we claim as the invention of the said BYRON DENSMORE, is—

1. Hanging the driving-wheel in a supplementary frame or its equivalent, which is hinged at one end to the main frame, while its opposite end may be adjusted and secured at various heights or be left free, as desired, whereby the cutting apparatus may be held at any desired height for reaping, or be left free to accommodate itself to the undulations of the ground for mowing, substantially as described.

2. The employment in, a harvesting-machine, of a wheel provided with a crank and lever for the purpose of raising and lowering the outer end of the finger-bar to cut high or low, substantially as described.

DAVID M. OSBORNE.
WM. A. KIRBY.

Witnesses:
CHAS. H. GARLOCK,
JNO. H. OSBORNE.